(12) United States Patent
Lee et al.

(10) Patent No.: US 6,716,947 B1
(45) Date of Patent: Apr. 6, 2004

(54) METHOD FOR PREPARING DIMETHYL DIPROPARGYLMALONATE POLYMER CONTAINING SIX-MEMBERED RING STRUCTURE

(75) Inventors: Youn-Woo Lee, Seoul (KR); Hyun-Nam Cho, Seoul (KR); Jong Sung Lim, Seoul (KR); Young-Jae Hur, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 10/269,964

(22) Filed: Oct. 15, 2002

(51) Int. Cl.[7] ................................................ C08F 38/00
(52) U.S. Cl. ....................... 526/285; 526/108; 526/138; 526/142; 528/396
(58) Field of Search .......................... 526/285, 90, 108, 526/138, 142; 528/396; 524/700

(56) References Cited

U.S. PATENT DOCUMENTS

| | | | | |
|---|---|---|---|---|
| 4,497,727 A | * | 2/1985 | Okamoto et al. | 252/500 |
| 4,877,917 A | * | 10/1989 | Farona et al. | 585/416 |
| 5,376,744 A | * | 12/1994 | Kennedy et al. | 526/89 |
| 5,571,850 A | * | 11/1996 | Ma et al. | 523/160 |
| 5,616,669 A | * | 4/1997 | Jin et al. | 526/285 |
| 5,663,237 A | * | 9/1997 | Lee et al. | 525/285 |
| 5,830,966 A | * | 11/1998 | Thang et al. | 526/321 |
| 6,025,459 A | * | 2/2000 | DeSimone et al. | 528/312 |
| 6,057,409 A | * | 5/2000 | Cunningham et al. | 526/201 |
| 6,191,215 B1 | * | 2/2001 | Beckham et al. | 524/731 |
| 6,379,874 B1 | * | 4/2002 | Ober et al. | 430/322 |
| 6,514,666 B1 | * | 2/2003 | Choi et al. | 430/270.1 |

FOREIGN PATENT DOCUMENTS

JP    1-267529 A   * 10/1989   ............. G02F/1/35

OTHER PUBLICATIONS

Ryoo et al. Macromolecules 1990, 23, 3029–3031.*
Choi et al., Chem. Rev. 2000, 100, 1645–1681.*
Kim et al., Macromolecules 1997, 30, 6677–6679.*
Fox et al., J. Am. Chem. Soc. 1994, 116, 2827–2843.*
Koo et al., Macromolecules 1993, 26, 2485–2488.*
Zhang et al., Chem Mater. 1993, 5, 1598–1599.*
Fox. et al., Organometallics 1992, 11, 2763–2765.*
Han et al. Macromolecules 1991, 24, 973–976.*
Clifford et al. Chem & Ind. 1996, 17, 449–452.*

* cited by examiner

Primary Examiner—Peter D. Mulcahy
Assistant Examiner—Rip A Lee
(74) Attorney, Agent, or Firm—Morrison & Foerster LLP

(57) ABSTRACT

Disclosed is a method for preparing dimethyl dipropargylmalonate polymer containing exclusively six-membered ring structure by using supercritical or sub-critical carbon dioxide as a solvent with a transition metal chloride catalyst.

3 Claims, 2 Drawing Sheets

METHOD FOR PREPARING DIMETHYL DIPROPARGYLMALONATE POLYMER CONTAINING SIX-MEMBERED RING STRUCTURE

BACKGROUND OF THE INVENTION

1. Field of the Invention

The present invention relates to a method for preparing a dimethyl dipropargylmalonate polymer, and particularly, to a method for preparing dimethyl dipropargylmalonate polymer containing six-membered ring structure from cyclopolymerization by using supercritical or sub-critical carbon dioxide as a solvent with transition metal chloride catalysts.

2. Description of the Background Art

In a polymer synthesis such as poly[bis(N-carbazoyl)-n-hexyl dipropargylmalonate], poly[bis(fluoroalkyl) dipropargylmalonate], poly(diethyl dipropargylmalonate), and poly(dipropargylsilanes), solvent such as chlorobenzene, benzene, toluene, tetrahydrofuran, dichloromethane, 1,2-dichloroethane, chloroform, and nitrobenzene is generally used, and transition metal chloride such as $MoCl_5$ is generally used as a catalyst to perform a cyclopolymerization (Macromolecules 1988, 21, 1991; Macromolecules 1990, 23, 3029; Macromolecules 1991, 24, 973; Macromolecules 1993, 26, 1191).

Even if the polymer has a bright application aspect because of excellent photoconductivity and electric conductivity, it has a problem that environment is seriously polluted by an organic solvent used in the polymerization and a problem that cyclopolymer having two structures simultaneously is generated (J. Am. Chem. Soc. 1994, 116, 2827).

Therefore, inventors of the present invention found that the aforementioned problems could be solved by using supercritical or sub-critical carbon dioxide instead of an organic solvent in a process for preparing dimethyl dipropargylmalonate.

SUMMARY OF THE INVENTION

Therefore, an object of the present invention is to provide a method for preparing dimethyl dipropargylmalonate polymer containing exclusively six-membered ring structure without five membered ring structure by using supercritical or sub-critical carbon dioxide having no toxicity, non-flammability and harmless to environment as a solvent, wherein a cleaner production processing is performed.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
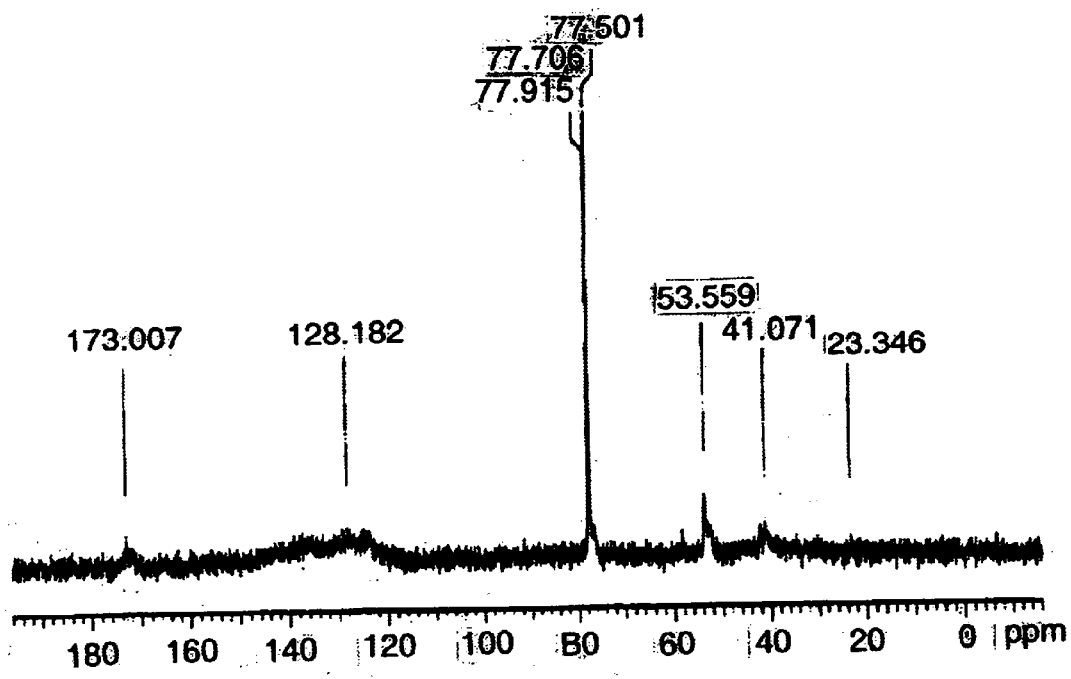
FIG. 1 shows an analysis result of $^{13}C$-NMR of dimethyl dipropargylmalonate polymer in case of using carbon dioxide as a solvent.

Reference will now be made in detail to the preferred embodiments of the present invention, examples of which are illustrated in the accompanying drawings.

There is provided a method for preparing dimethyl dipropargylmalonate polymer containing exclusively six-membered ring structure from cyclopolymerization by using supercritical or sub-critical carbon dioxide as a solvent with transition metal chloride catalysts.

Hereinafter, the present invention will be explained in detail.

Generally, if monomer dimethyl dipropargylmalonate used in the present invention is cyclopolymerized, polymer having six-membered ring structure and five-membered ring structure simultaneously is generated (Referring to reaction formula 1).

reaction formula 1

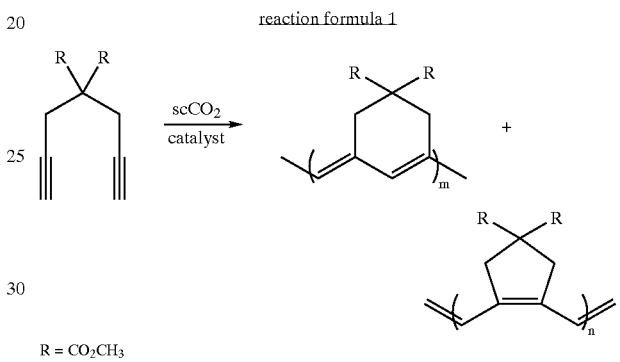

$R = CO_2CH_3$

However, in the present invention, monomer dimethyl dipropargylmalonate is cyclopolymerized by using supercritical or sub-critical carbon dioxide instead of an organic solvent as a reaction solvent, thereby providing dimethyl dipropargylmalonate polymer having only six-membered ring structure not the mixture of the five-membered ring structure and the six-membered ring structure as shown in the above formula 1.

In a preparing method of the present invention, a reaction is performed by using supercritical or sub-critical carbon dioxide having no toxicity, non-flammability and harmless to environment as a solvent. Accordingly, a problem to pollute environment generated at the time of using the conventional organic solvent can be solved not by using organic solvents. Especially, is provided dimethyl dipropargylmalonate polymer having only six-membered ring structure in polymer structure, which was impossible to realize by the conventional organic solvent.

In the preparing method of the present invention, it is preferable that a reaction temperature is ranged from 15° C. to 100° C., a reaction pressure is ranged from 50 to 400 atmospheric pressure, and a reaction time is within 24 hours, and it is more preferable that a reaction temperature is 25° C. to 60° C., a reaction pressure is 63 to 300 atmospheric pressure, and a reaction time is within 6 hours.

Also, in the present invention, transition metal chloride catalysts such as $MoCl_5$, $PdCl_2$, $WCl_6$, and $RuCl_3$ are used as metal catalysts, among which $MoCl_5$ having the highest reaction yield is the most suitable.

Hereinafter, a method for preparing dimethyl dipropargylmalonate polymer of the present invention will be explained in detail.

In the present invention, not only dimethyl dipropargylmalonate (DMDPM) but also carbon dioxide (purity more than 99%), $MoCl_5$ (purity more than 99.6%), $PdCl_2$ (purity more than 98.5%), $WCl_6$, $RuCl_3$, azobis(isobutyronitrile) (AIBN), $CHCl_3$, and $CH_3OH$ are used, and as a reactor, used is a cylinder made of stainless steel and having a volume of 25 ml.

First of all, air in a reactor is substituted by nitrogen, and constant amount of monomer dimethyl dipropargylmalonate exactly measured is put, then catalyst is weighed under dry nitrogen atmosphere to be put in the reactor. Air in the reactor is substituted by carbon dioxide two or three times, and carbon dioxide is inserted into the reactor by using a high-pressure pump. After fluid in the reactor is agitated and heated to reach a desired reaction temperature, carbon dioxide is supplemented by the pump to reach a desired pressure.

Then, cyclopolymerization is performed at a steady reaction temperature and a reaction pressure for a period time. Upon completing the reaction, it is stopped heating and agitation, and then a temperature is lowered and carbon dioxide is slowly exhausted to an exit valve. Reaction products are dissolved in $CHCl_3$, and cross-linked insoluble polymer (I) is filtered. Then, $CH_3OH$ is added to filtrate so as to precipitate, filter, and obtain polymer (II) which is not cross-linked. The obtained two polymers I and II are dried in a vacuum heater for 24 hours at 40° C., and weighed respectively to calculate a conversion and a yield. Then, the sample is characterized using $^1$H-NMR, $^{13}$C-NMR and IR.

As a result of the measurement of the reaction product by $^1$H-NMR, $^{13}$C-NMR, and IR, triple bond of monomer dimethyl dipropargylmalonate is changed into double bond, which proves that monomer dimethyl dipropargylmalonate is polymerized into poly(dimethyl dipropargylmalonate) (poly(DMDPM)) by cyclopolymerization in a carbon dioxide solvent. In the meantime, referring to FIG. 1, when an analysis result of $^{13}$C-NMR of synthesized polymer is examined in its structure aspect, 57–58 ppm peak representing five-membered rings is not shown, but one 53.559 ppm peak is largely and distinctively shown. That shows that five-membered ring structure does not exist and only six-membered ring structure exists in synthesized dimethyl dipropargylmalonate polymer (J. Am. Chem. Soc. 1994, 116, 2827). This is a novel result compared with a conventional result that polymer having five-membered ring structure and six-membered ring structure simultaneously is generated in an organic solvent. Whereas J. Am. Chem. Soc. 1994, 116, 2827 discloses the ratios of six-membered ring structure to five-membered ring structure are changed from 80:20 to 20:80, the present invention using supercritical or sub-critical carbon dioxide as a solvent yield the polymer which is in the ratio of 100:0 basically.

Hereinafter, the present invention will be explained more specifically by following examples. However, the scope of the present invention is not limited to following examples.

EXAMPLE 1

Change of Used Amount of Cataly $MoCl_5$

Under the common reaction condition that dimethyl dipropargylmalonate is 1.0 g and a reaction time is 24 hours, a reaction is performed by a method equal to the aforementioned method except that catalyst amount is changed on the basis of mol% of dimethyl dipropargylmalonate, thereby obtaining a conversion and a yield. As shown in table 1, used amount of transition metal chloride catalyst $MoCl_5$ largely influences to a conversion and a yield. The more catalyst to monomer dimethyl dipropargylmalonate is used, the higher a yield of a product is. All the poly(dimethyl dipropargylmalonate) are consisted of exclusively six-membered ring structure.

TABLE 1

| Catalyst | Catalyst amount to monomer (mol %) | Temperature (° C.) | Pressure (bar) | Conversion (wt. %) | Yield (wt. %) |
|---|---|---|---|---|---|
| $MoCl_5$ | 1.0 | 40 | 150 | 19.7 | 11.8 |
| $MoCl_5$ | 2.0 | 40 | 150 | 45.9 | 20.0 |
| $MoCl_5$ | 3.0 | 40 | 150 | 37.2 | 22.4 |
| $MoCl_5$ | 4.0 | 40 | 150 | 42.0 | 29.6 |
| $MoCl_5/Sn(n-Bu)_4$ | 1.0/1.0 | 40 | 250 | 5.3 | 1.0 |
| $MoCl_5/Sn(n-Bu)_4$ | 2.0/2.0 | 40 | 250 | 75.1 | 11.0 |

EXAMPLE 2

Change of Reaction Temperature

Under the common reaction condition that dimethyl dipropargylmalonate is 1.0 g, $MoCl_5$ is 2.0 mol %, and a reaction time is 24 hours, a reaction is performed by a method equal to the aforementioned method except that a reaction temperature is changed, thereby obtaining a conversion and a yield. However, in case of sub-critical state (26° C.) experiment, it took four hours to react. Table 2 shows an experiment result according to a change of a reaction temperature at the time of using a catalyst of $MoCl_5$. All the poly(dimethyl dipropargylmalonate) are consisted of exclusively six-membered ring structure.

TABLE 2

| State | Temperature (° C.) | Pressure (bar) | Conversion (wt. %) | Yield (wt. %) |
|---|---|---|---|---|
| Supercritical | 60 | 250 | 51.0 | 8.1 |
| Supercritical | 40 | 250 | 37.5 | 17.0 |
| Supercritical | 38 | 250 | 31.6 | 8.1 |
| Supercritical | 35 | 250 | 31.4 | 10.2 |
| Sub-critical | 26 | 150 | 30.0 | 22.0 |

As shown in table 2, a change of a reaction temperature does not largely influence to the yield in a range of 26~60° C.

EXAMPLE 3

Change of Reaction Pressure

Under the common reaction condition that dimethyl dipropargylmalonate is 1.0g, $MoCl_5$ is 2.0 mol %, and a reaction time is 24 hours, a reaction is performed by a method equal to the aforementioned method except that a reaction pressure is changed, thereby obtaining a conversion and a yield. Table 3 shows an experiment result according to a change of a reaction pressure at the time of using a catalyst of $MoCl_5$. All the poly(dimethyl dipropargylmalonate) are consisted of exclusively six-membered ring structure.

TABLE 3

| Temperature (°C.) | Pressure (bar) | Conversion (wt. %) | Yield (wt. %) |
| --- | --- | --- | --- |
| 40 | 300 | 51.1 | 7.7 |
| 40 | 250 | 37.5 | 17.0 |
| 40 | 200 | 26.5 | 6.5 |
| 40 | 150 | 60.2 | 20.9 |
| 40 | 100 | 67.3 | 5.8 |
| 40 | 90 | 54.5 | 8.1 |

As shown in table 3, an influence of a reaction pressure on conversion and yield is not great.

EXAMPLE 4

Change of Reaction Time

Under the common reaction condition that dimethyl dipropargylmalonate is 1.0 g, $MoCl_5$ is 2.0 mol %, a reaction temperature is 40° C., and a reaction pressure is 150 bar, a reaction is performed by a method equal to the aforementioned method except that reaction time is changed, thereby obtaining a conversion and a yield. Table 4 shows an experiment result according to a change of reaction time at the of a catalyst of $MoCl_5$. All the poly(dimethyl dipropargylmalonate) are consisted of exclusively six-membered ring structure.

TABLE 4

| Reaction time (hr) | Conversion (wt. %) | Yield (wt. %) |
| --- | --- | --- |
| 1 | 16.7 | 6.2 |
| 2 | 34.3 | 19.6 |
| 4 | 45.9 | 20.0 |
| 6 | 47.5 | 17.8 |
| 8 | 42.1 | 12.9 |
| 16 | 53.3 | 12.8 |
| 24 | 60.2 | 20.9 |

As shows in table 4, when supercritical or sub-critical carbon dioxide is used as solvent, a long-time reaction is not required differently from a case that organic solvent is used. Under a common reaction condition that $MoCl_5$ is 2.0 mol %, a reacting temperature is 40° C., and a reaction pressure is 150 bar, a preferable reaction time is 2 to 6 hours.

COMPARATIVE EXAMPLE

In the said reactor, monomer dimethyl dipropargylmalonate 1.0 g is reacted by using an organic solvent of carbon tetrachloride with 2.0 mol % $MoCl_5$ catalyst to the monomer, at 40° C. and atmospheric pressure, thereby obtaining polymer. Also, a conversion and a yield are obtained by the aforementioned method. Table 5 shows the experiment result.

TABLE 5

| Reaction time (hr) | Used amount of carbon tetrachloride (ml) | Conversion (wt %) | Yield (wt %) |
| --- | --- | --- | --- |
| 4 | 10 | 82.6 | 7.6 |
| 24 | 20 | 87.1 | 6.3 |

As shown in table 5, in case of using organic solvent, whereas the conversion is comparatively high, a yield is low since the polymer containing many cross-linkage is generated.

Figure 2:
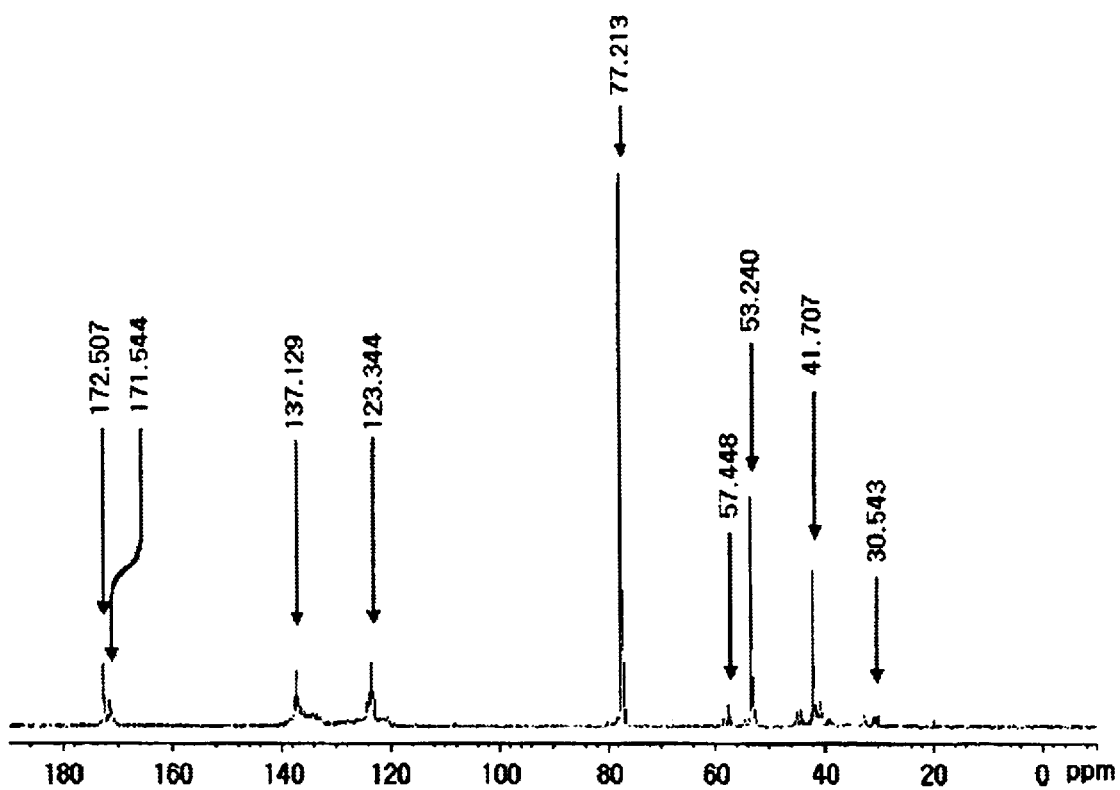
FIG. 2 shows an analysis result of $^{13}C$-NMR of dimethyl dipropargylmalonate polymer in case of using carbon tetrachloride as an organic solvent.

Meanwhile, referring to the analysis result of $^{13}C$ NMR, as shown in FIG. 2, polymer having six-membered ring structure (53.240 ppm) and five-membered ring structure (57.448 ppm) simultaneously is obtained in case of using an organic solvent.

As aforementioned, in a method for preparing dimethyl dipropargylmalonate polymer of the present invention, a reaction is performed by using supercritical or sub-critical carbon dioxide having no toxicity, non-flammability and harmless to environment as a solvent. Accordingly, a problem to pollute environment generated at the time of using the conventional organic solvent can be solved. Especially, is provided dimethyl dipropargylmalonate having only six-membered ring in polymer structure, which was impossible to realize by the conventional solvent.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for preparing dimethyl dipropargylmalonate polymer containing exclusively six-membered ring structure, wherein monomer dimethyl dipropargylmalonate is cyclopolymerized by using supercritical or sub-critical carbon dioxide as a solvent with transition metal chloride catalysts.

2. The method of claim 1, wherein the reaction temperature ranges from 15° C. to 100° C., the reaction pressure is ranges from 50 to 400 bar, and the reaction time is within 24 hours.

3. The method of claim 1 or 2, wherein the reaction temperature is 25° C. to 60 ° C., the reaction pressure is 63 to 300 bar, and the reaction time is within 6 hours.

\* \* \* \* \*